United States Patent [19]

Philley et al.

[11] Patent Number: 5,143,417
[45] Date of Patent: Sep. 1, 1992

[54] SHELVING UNIT FOR COLLAPSIBLE CAMPERS

[75] Inventors: George C. Philley, Topeka; Homer Ratliff, Avilla; Ira H. Kauffman, Goshen, all of Ind.

[73] Assignee: Starcraft RV, Inc., Topeka, Ind.

[21] Appl. No.: 726,296

[22] Filed: Jul. 5, 1991

[51] Int. Cl.[5] .............................................. B60P 3/355
[52] U.S. Cl. .................................... 296/176; 296/170; 296/172; 5/118; 108/145
[58] Field of Search ........ 296/162, 163, 165, 169–170, 296/172–175, 176; 5/9.1, 118; 108/44, 48, 49, 125, 145

[56] References Cited

U.S. PATENT DOCUMENTS

| | | | |
|---|---|---|---|
| 2,249,845 | 7/1941 | Mitchell . | |
| 3,246,347 | 4/1966 | Mason . | |
| 3,506,299 | 4/1970 | Arnold et al. | 296/170 |
| 3,588,168 | 6/1971 | Froitzheim et al. | 5/118 X |
| 3,680,908 | 8/1972 | Bowen | 296/170 |
| 3,823,975 | 7/1974 | Cooper | 296/173 |
| 3,916,462 | 11/1975 | Riches | 5/17 X |
| 3,967,327 | 7/1976 | Severson | 5/8 X |

Primary Examiner—Dennis H. Pedder
Attorney, Agent, or Firm—Price, Heneveld, Cooper, DeWitt & Litton

[57] ABSTRACT

A shelf for a platform of a fold-down camper is provided, having an end frame with a first and second leg pivotally coupled to opposite sides of the platform and adapted to pivot from a first position substantially parallel to the platform to a second position substantially perpendicular to the platform for supporting an awning. Disposed between the first and second legs, and pivotally coupled thereto, is a shelf. The shelf is oriented so as to be substantially parallel to the platform and that relationship is maintained throughout the movement of the awning support by at least one leg interconnecting the shelf to the platform. All of the supports for the shelf are pivotally coupled and parallel to each other so that the shelf remains parallel to the platform. The shelf is available to store personal belongings or ornamental objects of the occupants without interfering with the occupants while reclined on the platform.

4 Claims, 2 Drawing Sheets

SHELVING UNIT FOR COLLAPSIBLE CAMPERS

BACKGROUND OF THE INVENTION

The present invention relates to collapsible tent campers and particularly to a collapsible shelving unit for use in such a camper.

Fold-down tent campers are popular self-contained units used for vacation living quarters. They typically include a kitchen, beds, a small bathroom and frequently, very limited storage areas. The interior furnishings are typically designed to be stored entirely within the camper when in a closed position for travel. Once the camper is at the desired location, the camper top is extended and the interior components positioned to provide a living space. Because of the often cramped quarters, storage space is often limited. Additional interior shelving space is desirable which may be used once the camper is in the extended and upright position. However, any such shelving must fit easily within the camper once closed and ready for transport.

SUMMARY OF THE INVENTION

The present invention provides a collapsible shelf which is pivotally coupled to a platform by a collapsible frame member and at least one other leg. In a preferred embodiment, a pair of spaced legs are pivotally coupled to opposite sides of the platform to support the shelf above an extendable bed formed by the platform. The shelf is automatically extended and retracted with the erection of an awning support structure. Such a shelf is useful for storing personal items including clothing which can be conveniently stored above the user's bed.

These and other objects, features and advantages can best be understood by reference to the following description, together with the accompanying drawings in which:

DETAILED DESCRIPTION OF THE PREFERRED EMBODIMENTS

Figure 1:
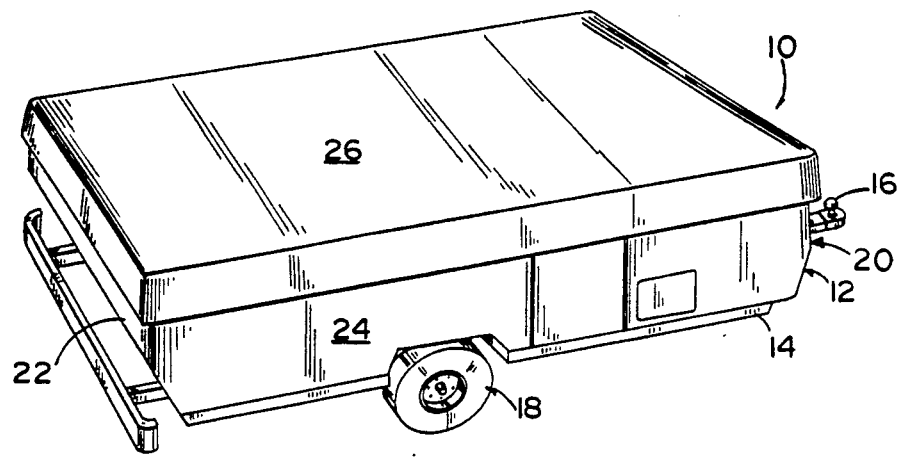
FIG. 1 is a perspective view of a fold-down tent camper shown in a closed or stowed configuration.

In referring to the drawing figures, like reference numerals will be used to indicate like structures or components. Camper 10 may be comprised of a lower frame 12 mounted to a metallic chassis 14. Chassis 14 includes a trailer hitch tongue 16 and a wheel assembly 18 so the trailer may be readily transported. Frame 12 forms a camper shell 20 having at least two end walls 22 joined by at least two sidewalls 24. A camper top 26 is disposed above frame 12 which can be collapsed to a closed position as seen in FIG. 1 and extended to a raised position above frame 12 and coupled thereto by a flexible tent-like intermediate section 27, as seen in FIG. 2.

Figure 2:
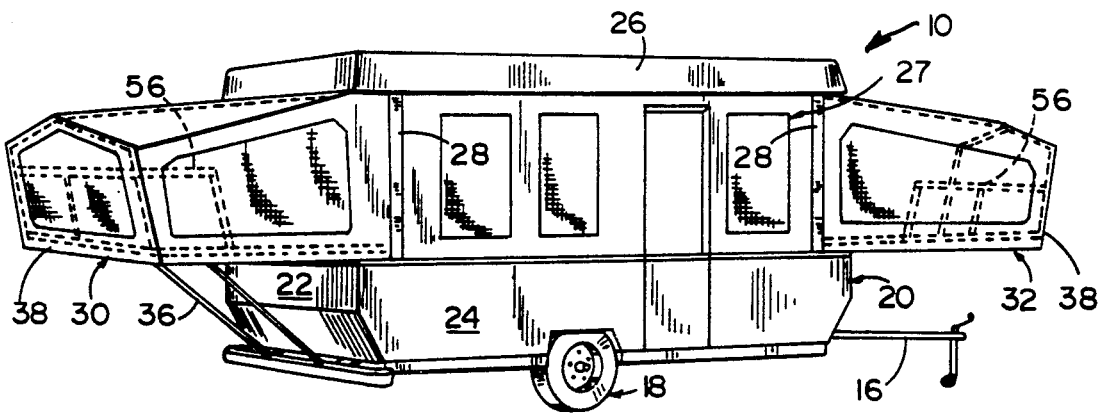
FIG. 2 is a perspective view of the fold-down tent camper of FIG. 1 shown in an extended upright use configuration.

FIG. 2 is a perspective view of the fold-down tent camper 10 shown in an extended and upright configuration. Frame 12 and top 26 define an interior volume wherein all of the interior furnishings of the camper may be stored while in transport. Although not shown, the interior may accommodate a dining area, a bathroom, and a kitchen complete with a sink, refrigerator, stove and storage areas. These components are designed to fit within the confines of frame 12. As suggested by FIGS. 1 and 2, the interior furnishings mentioned above are designed to pack within the confines of the frame 12 and be covered by top 26. As a matter of efficiency, every cubic inch of space within frame 12 with top 26 closed, is valuable. With the addition of furnishing and accessories, the frame must be of sufficient size to hold them while simultaneously minimizing the size and weight of the camper for easy towing and storage.

Referring again to FIG. 2, top 26 is adapted to be supported directly above frame 12 by a plurality of telescopic or foldable posts 28, each positioned near the corners of the frame. In a preferred embodiment, posts 28 may telescope to extend and lower the roof while simultaneously conserving space within the camper. Posts 28 may be extended and retracted by a cable and pulley system powered either by a manual or electrically driven winch (not shown). Since weight is also a factor, it is preferred that post 28 be constructed from aluminum, although stainless steel or other rigid material may be used.

Located along the upper portion of frame 20 and oriented parallel to base 12 may be bunk extensions or wings 30 and 32. Each bunk extension is a platform adapted to slide within channels 34 coupled to an upper edge of sidewalls 24. Each platform may be pulled from an inner position within frame 12 to a cantilevered position over end walls 22. The platforms are preferably rectangular in shape having a width such that each platform fits between posts 28 located at the end of the camper. Braces 36 may be used to support the bunk extensions attaching to an outer or distal end 38 of each platform and interconnected to a base of end walls 22.

Figure 3:
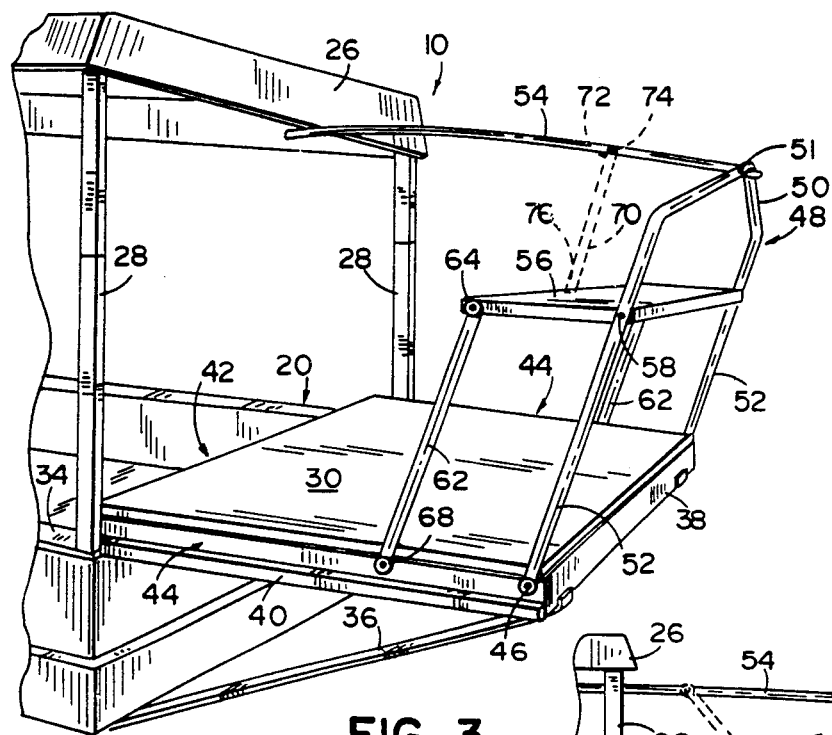
FIG. 3 is a fragmentary perspective view of a preferred embodiment of a collapsible shelf embodying the present invention for use in the fold-down tent camper shown in FIGS. 1 and 2.

FIG. 3 is a fragmentary perspective view of a preferred embodiment of a convenient and automatically collapsible shelf for use in a fold-down tent camper such as shown in FIGS. 1 and 2. The figure shows camper 10 with top 26 raised to its fullest extent from frame 20 by telescoping posts 28. One bunk extension such as 30 has been extended horizontally from camper 10 along channels and channel guides 40. The extension 30 has an outside or distal end 38, and inside or proximate end 42 and parallel or lateral ends 44. Pivotally coupled by pivot means such as bolts 46 to the sides 44 near the distal end 38 of platform 30, may be the ends of an awning frame 48. The awning support preferably has an arched portion 50 supported by vertical legs 52 forming a frame at the end of platform 30. The top 25 of arch 48 may be pivotally coupled by a swivel to one end of a ceiling rod 54 which may be used to raise and lower the awning support. An opposite end of the ceiling rod is adapted to be received by a conventional spring-pin latch (not shown) located along an inside edge of camper top 26. The awning frame 48, swivel, and ceiling rod 54 may be constructed from an aluminum alloy tubing having sufficient strength to support a tent awning 27, shown in FIG. 2.

Positioned between legs 52 of awning frame 48, and pivotally coupled therebetween by a pair of spaced pivot pins or axles 58, is a shelf 56. Shelf 56 is supported by at least one and preferably a pair of spaced legs 62, each having one end pivotally coupled by pivot pins 64 to an end of shelf 56 proximate side 66, and a second end pivotally coupled at 68 to sides 44 of platform 30. Legs 62 are parallel to legs 52 and together with shelf 56 form a parallelogram. The shelf 56 is made of a lightweight, yet high strength material such as an aluminum alloy, fiberglass or wood. Using these materials, various construction techniques are available so the shelf can accommodate a wide range of objects. In a preferred embodiment, the shelf is constructed from wood having an aluminum edging to prevent objects from rolling off. The shelf may be rectangular in shape having a longitudinal axis horizontally oriented and parallel to the end of platform 30. The shelf should be positioned far enough up the legs 52 and 62 above the platform to accommodate a sleeping adult.

In an alternate embodiment, shelf 56 may be coupled between the vertical members 52 of the awning support 48, as described above. The opposite edge of the shelf may be maintained parallel to the platform by a shelf support pendant from the ceiling rod 54. The pendant support 70 shown in phantom lines, may have an upper end 72 pivotally coupled by a pin 74 through the ceiling rod 54. A lower end 76 of the support may also be pivotally coupled to the central edge of the shelf 56 directly below the rod 54.

Figure 4:
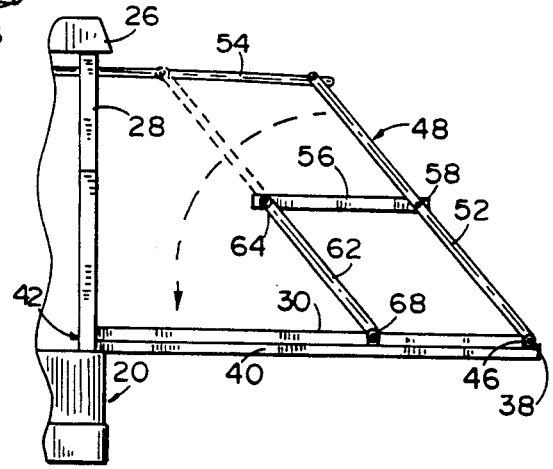
FIG. 4 is a fragmentary side elevational view of the collapsible shelf shown in FIG. 3 shown in a partially stowed position.
Figure 5:
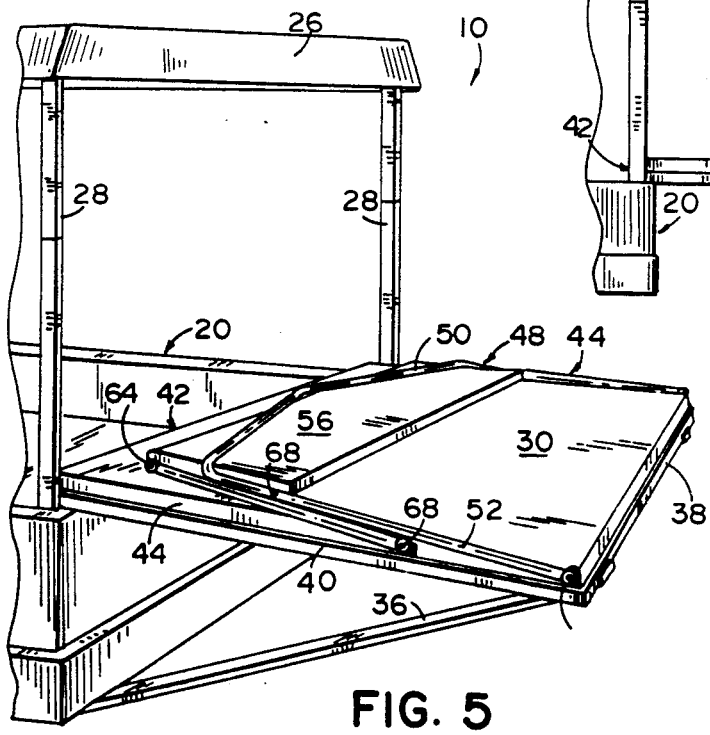
FIG. 5 is a fragmentary perspective view of the collapsible shelf shown in a fully collapsed and stowed position.

The operation of the shelf is best understood by referring to FIGS. 3-5. FIG. 4 is a side elevational view of the automatically collapsible shelf shown in FIG. 3, in a partially stowed position, while FIG. 5 is a perspective view of the shelf shown in a fully collapsed and stowed position. In the full upright and locked position, shelf 56 is supported above and parallel to platform 30 by awning frame 48 and legs 62. Both the frame and the legs are adapted to pivot about their coupling points, 46 and 68, respectively, from a substantially horizontal position, up through the vertical and fixed into a slightly outwardly inclined orientation by awning rod 54. A tent or awning 27 encloses platform 30 and is supported by awning frame 48, rod 54 and the inside edge of camper top 26. For the purposes of illustrating the features of shelf 56, the awning has not been shown, but is assumed that operation of the bunk extension and automatic erection of the shelf is coincident with the erection of the tent awning. In this use position, the occupant of the bed positioned on platform 30 can conveniently store personal items such as clothing, personal care items, and the like. The shelf dimensions may vary, ranging from covering only a portion of the space above the platform to covering the entire space above the platform. It should be apparent that the larger the shelf, the greater number of supports may be necessary. It is also preferred that the shelf be supported sufficiently far above the platform so as not to interfere with an occupant laying on the platform.

To lower the tent awning and collapse awning support 48 and 54, rod 54 is detached from the latch located in top 26. The rod may then be used to pull the awning frame inward past the vertical, and allowed to move down toward the platform, as shown in FIGS. 4 and 5. Legs 62, in conjunction with vertical members 52 of the awning support, maintain the parallel orientation of shelf 56 to platform 30. With the awning frame and shelf in the collapsed position, the shelf is nested between supports 52 and 62 and on top of platform 30. The awning rod may then be disconnected from top of arch 50 and stored within the camper trailer. Typically, the camper frame will include open space near the floor even when in a collapsed position and personal items such as duffle bags, etc., stored on shelf 56 when the camper is in use can be moved to the floor area for transportation. The tent awning may be folded and the bunk extension retracted inward above frame 12 so that top 26 ma be lowered to close the camper. In order to again deploy the camper trailer, the reverse steps are followed. Naturally a camper 10 such as shown in FIGS. 1 and 2 will include a shelf 56 at each end as shown in FIG. 2, for the convenience of those occupying these areas.

Although the foregoing description was presented with reference to a particular model of camper, the present invention has equal application to other models of fold-down campers such as van campers, truck-mounted campers or travel trailers. It will become apparent to those skilled in the art that various modifications to the preferred embodiment described herein can be made without departing from the spirit or scope of the invention as defined by the appended claims.

The embodiments of the invention in which an exclusive property or privilege is claimed are defined as follows:

1. A shelf for a collapsible camper, comprising:
    a platform adapted to extend from said collapsible camper;
    an end frame having a first pair of legs each coupled to an opposite side of said platform and adapted to pivot upwardly in an arc from a first position substantially parallel to said platform to a second position having an angle measured along said arc of greater than 90°;
    a shelf pivotally coupled to said end frame between said first pair of legs and disposed substantially parallel to said platform;
    a second pair of legs, each interconnecting an end of said shelf to one of said opposite sides of said platform for preserving said substantially parallel orientation of said shelf to said platform with said end frame moving from said first position through to said second position; and
    a ceiling rod having one end pivotally coupled to said end frame and having an opposite end detachably coupled to a roof of said camper, for raising and lowering said end frame and said shelf with respect to said platform.

2. A shelf for a collapsible camper as recited in claim 1, wherein said shelf is substantially above said platform.

3. A shelf for use in a bunk extension of a fold-down camper having a proximate end and a distal end relative to said camper when extended, comprising:
    a support having a first and second vertical member pivotally coupled to opposite sides of said bunk extension about an axis parallel to the distal end of said bunk extension, said support adapted to pivot upwardly about the coupling in an arc from a first position substantially parallel to the bunk extension to a second position, having an arc angle more than 90° measured from said bunk extension;
    a pair of legs, each having one end pivotally coupled to one of said opposite sides of said bunk extension and distant from said first and second vertical member of said support;

a shelf supported substantially above and parallel to said bunk extension by said pair of legs and between said first and second vertical members of said support; and said ceiling rod coupled to an upper portion of said support and detachably coupled to said fold-down camper for keeping said support in said second position and adapted to move said support from said second position to said first position adjacent said bunk extension, said first and second vertical members of said support and said pair of legs simultaneously maintaining a parallel relationship of said shelf to said platform.

4. A collapsible shelf for a fold-down camper, comprising:

a platform having a proximate end, a distal end and a first and second parallel side, said platform adapted to extend from said camper at said proximate end;

an end frame having a first and second leg pivotally coupled to said first and second parallel sides of said platform and pivot about an axis parallel to said distal end from a first position substantially parallel to said platform to a second position substantially perpendicular to said platform;

a ceiling rod having one end pivotally coupled to said end frame and having an opposite end detachably coupled to said camper for raising and lowering said end frame;

a shelf disposed above said platform and pivotally coupled between said first and second leg of said end frame; and at least one leg having a first end pivotally coupled to said ceiling rod and a second end pivotally coupled to an edge of said shelf for maintaining a parallel orientation of said shelf to said platform.

* * * * *

UNITED STATES PATENT AND TRADEMARK OFFICE
CERTIFICATE OF CORRECTION

PATENT NO. : 5,143,417
DATED : September 1, 1992
INVENTOR(S) : George C. Philley et al It is certified that error appears in the above-indentified patent and that said Letters Patent is hereby corrected as shown below:

Column 2, line 59; after "top" delete --25--.

Column 4, liine 10; "ma" should be --may--.

Signed and Sealed this

Twenty-eighth Day of December, 1993

Attest:

BRUCE LEHMAN

Attesting Officer     Commissioner of Patents and Trademarks